Sept. 30, 1958     H. C. BROWN     2,853,783
ROAD SCRIBER
Filed Jan. 29, 1957
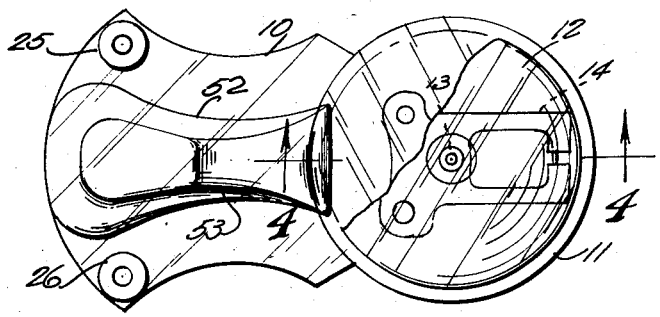
Fig. 1.
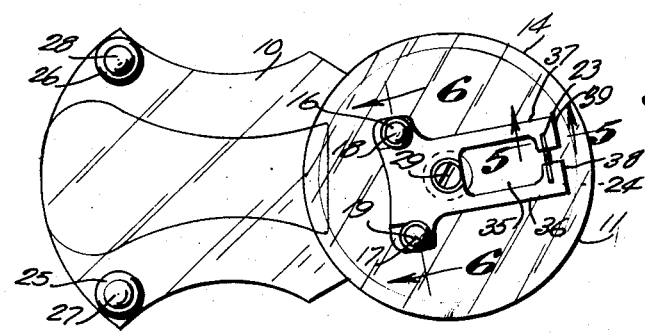
Fig. 2.
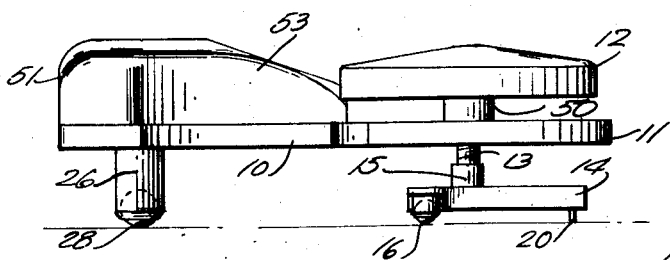
Fig. 3.
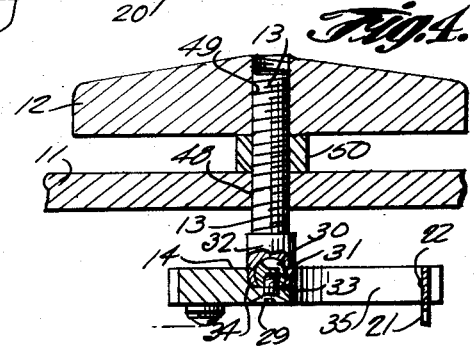
Fig. 4.
Fig. 5.
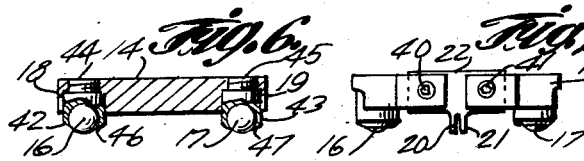
Fig. 6.    Fig. 7.
INVENTOR.
Harry C. Brown
BY Victor J. Evans & Co.
ATTORNEYS

United States Patent Office 2,853,783
Patented Sept. 30, 1958

2,853,783
ROAD SCRIBER
Harry C. Brown, San Antonio, Tex.

Application January 29, 1957, Serial No. 637,010

3 Claims. (Cl. 33—41)

This invention relates to drawing instruments or tools particularly as used in map making, and in particular a scribing instrument for scribing a pair of parallel lines, such as indicating a road on a map and wherein the nibs for scribing the lines are mounted in a head pivotally mounted on the lower end of a stem mounted in the center of a transparent disc of a carrier and positioned to be observed through a magnifying lens on the upper end of the stem.

The purpose of this invention is to provide a manually actuated holder for supporting a pair of nibs for use in scribing spaced parallel lines such as used for roads and the like.

Various types of instruments have been provided for map drawings and several ink retaining pens have been used for scribing parallel lines to indicate roadways and the like, however, it is difficult to hold instruments of this type in such a manner that an operator or draftsman has absolute control over the scribing nibs. With this thought in mind this invention contemplates a holder for a pair of road scribing nibs wherein with the device held between the thumb and forefinger of one hand the nibs may be actuated to accurately follow a line representing a road, or the like.

The object of this invention is, therefore, to provide a carrier for a pair of road scribing nibs whereby an operator has absolute control over the path followed by the nibs.

Another object of the invention is to provide a road scribing instrument having a pair of spaced nibs in which the nibs may readily be removed and replaced with nibs of different sizes.

A further object of the invention is to provide a carrier for a pair of road scribing nibs to facilitate actuating the nibs to scribe a road in which the device is of a simple and economical construction.

With these and other objects and advantages in view the invention embodies a carrier including a mounting plate having a transparent disc extended from one end and with the opposite end supported by posts having balls in lower ends thereof and with a thumb and finger gripping handle on the upper surface, a stem extended through the center of the disc, a lens on the upper end of the stem, and a head mounted with a swivel joint on the lower end of the stem and having spaced posts with balls in lower ends thereof on one end and a pair of scribing nibs on the opposite end.

Other features and advantages of the invention will appear from the following description taken in connection with the drawing, wherein:

Figure 1 is a plan view of the improved road scribing instrument.

Figure 2 is a view looking upwardly toward the under surface of the instrument.

Figure 3 is a side elevational view of the improved road scribing instrument.

Figure 4 is a longitudinal section through the scribing end of the instrument taken on line 4—4 of Fig. 1 and with the parts shown on an enlarged scale.

Figure 5 is a section taken on line 5—5 of Fig. 2 with the parts shown on an enlarged scale, showing one of the set screws for clamping the scribing nibs in position in the head of the instrument.

Figure 6 is a cross section taken on line 6—6 of Fig. 2 also with the parts shown on an enlarged scale showing the posts on one end of the head of the instrument.

Figure 7 is an elevational view looking toward the outer end of the head of the instrument with the parts shown on an enlarged scale and with other parts of the carrier omitted.

Referring now to the drawing wherein like reference characters denote corresponding parts the improved road scribing instrument of this invention includes a mounting plate 10, a disc 11 of transparent material extended from one end of the mounting plate, a lens 12 positioned above the disc and mounted on a stem 13, a head 14 carried by the lower end 15 of the stem 13 and having balls 16 and 17 in posts 18 and 19 on one end and spaced nibs 20 and 21 depending from a plate 22 retained in slots 23 and 24 in the opposite end, and posts 25 and 26 with balls 27 and 28 in the lower ends depending from the end of the mounting plate and positioned at the end of the carrier opposite to that on which the disc 11 and lens 12 are positioned.

The mounting plate, disc, lens and supporting posts are conventional, the improvement being in the mounting of the head 14 wherein the head is secured by a screw 29 to a ball 30 in a socket 31 in a head 32 on the lower end of the threaded stem 13, whereby a swivel joint is provided providing a flexible connection between the head 14 and head 32 of the stem. The arcuate lower surface 33 of the head 32 is positioned in an arcuate recess 34 of the head 14 and, as illustrated in Figs. 2 and 4 the head 14 is provided with an opening 35 on the sides of which arms 36 and 37 are positioned and the ends of the arms are provided with projections 38 and 39. The slots 23 and 24 in which the plate 22 is positioned are formed in the projections 38 and 39 and the plate is secured in the slots with set screws 40 and 41.

The balls 16 and 17 are mounted in sockets 42 and 43 in posts 18 and 19 of screws 44 and 45, which are threaded in the extensions at the end of the head 14. The balls are retained in the sockets 42 and 43 by crimping the lower edges of the sockets inwardly as shown at the points 46 and 47, in Fig. 6.

The threaded stem or screw 13 is threaded in an opening 48 in the disc 11 and also in an opening 49 in the lens 12 and the collar 50, which is also threaded on the stem, provides a lock nut securing the disc 11 in adjusted positions on the stem.

The mounting plate 10 is provided with a thumb and finger gripping handle 51 and the sides of the handle are provided with arcuate surfaces 52 and 53.

With the parts assembled as illustrated and described a road scribing instrument is provided whereby two parallel lines may be marked on a drawing or plate and with the scribing head magnified by the lens they may be accurately actuated to follow a line indicating a road or the like.

It will be understood that modifications, within the scope of the appended claims, may be made in the design and arrangement of the parts without departing from the spirit of the invention.

What is claimed is:

1. A road scriber comprising a horizontally disposed head having an opening extended through one end and with extensions at the sides of the opposite end, posts having balls in sockets in the ends thereof threaded in the extensions of the head, the opening through the head providing arms at the sides and said arms having projections extended inwardly from ends thereof, said projections of the arms having slots therein, a plate having depending nibs on one edge clamped in the slots of the projections of the arms of the head, a threaded stem extended from one side of the head and positioned intermediate of the length thereof, and a ball and socket connection for securing the head to the end of the threaded stem.

2. In a scribing instrument, the combination which comprises a mounting plate having a disc of transparent material on one end and a handle on the upper surface, posts with balls in lower ends thereof depending from the mounting plate, a threaded stem threaded in an opening through the center of the disc and having a socket in the head on the lower end, a collar providing a lock nut threaded on the stem, a lens threaded on the stem and positioned above the collar, a ball positioned in the socket on the lower end of the threaded stem, a head having an opening therethrough positioned at the lower end of the threaded stem, the opening through the head providing arms at the sides thereof, said arms having projections extended inwardly from the ends thereof, said projections having slots therein, a screw extended through the head and threaded into the ball, said ball and socket of the threaded stem providing a universal joint, posts having balls in lower ends thereof mounted in one end of the head, a second plate having spaced nibs depending from one edge mounted in the slots in the projections at the ends of arms of the head and means for clamping the second plate with the nibs thereon in the head.

3. In a road scriber, the combination which comprises a horizontally disposed mounting plate having a handle extended upwardly from the upper surface and having a disc of transparent material extended from one end thereof, posts having balls in lower ends thereof extending from one end of the mounting plate, a threaded stem extended through the center of the disc, a locking collar threaded on the threaded stem and positioned above said disc, a lens threaded on the upper end of the threaded stem, the lower end of the threaded stem having a ball receiving socket therein, a horizontally disposed head having a ball secured thereto centrally thereof, said ball being received in said socket to provide a universal joint between said head and said threaded stem, said head also having an opening therethrough forming arms at the sides and said arms having inwardly extended projections on extended ends, said projections having vertically disposed slots extended therethrough, a second plate having a pair of spaced nibs depending from one edge positioned with ends thereof in the slots of the projections, set screws for locking ends of the second plate in said projections, the end of the head opposite to the end in which the second plate with the nibs thereon is secured in the projections being provided with posts having balls in lower ends thereof for leveling the head in relation to the nibs.

References Cited in the file of this patent

UNITED STATES PATENTS

| | | |
|---|---|---|
| 2,492,870 | Kelsh | Dec. 27, 1949 |
| 2,636,416 | Platt | Apr. 28, 1953 |
| 2,735,177 | Adams | Feb. 21, 1956 |
| 2,735,178 | Adams | Feb. 21, 1956 |
| 2,748,474 | Brown | June 5, 1956 |
| 2,782,501 | Adams | Feb. 26, 1957 |